United States Patent [19]
Benedict et al.

[11] Patent Number: 5,911,471
[45] Date of Patent: Jun. 15, 1999

[54] DUAL PIVOTING BUDDY SEAT WITH SLIDING UTILITY TRAY

[75] Inventors: Tyler R. Benedict, Ephrata; David B. Stauffer, New Holland, both of Pa.

[73] Assignee: New Holland North America, Inc., New Holland, Pa.

[21] Appl. No.: 08/823,281

[22] Filed: Mar. 21, 1997

[51] Int. Cl.$^6$ ............................... A47C 7/62; B60N 2/02
[52] U.S. Cl. ............................... 297/158.1; 297/188.04; 297/188.09; 297/378.1; 297/378.12
[58] Field of Search ........................... 297/188.1, 188.08, 297/188.09, 188.04, 188.05, 353, 378.1, 378.12

[56] References Cited

U.S. PATENT DOCUMENTS

| | | | |
|---|---|---|---|
| 2,759,529 | 8/1956 | Hagadorn | 297/188.1 X |
| 2,989,115 | 6/1961 | Egles | 297/188.1 |
| 3,099,482 | 7/1963 | Woodruff, Sr. | 297/188.09 |
| 3,336,077 | 8/1967 | Radke et al. | 297/188.1 |
| 3,453,025 | 7/1969 | Grant | 297/188.1 X |
| 3,512,827 | 5/1970 | Stange | 297/378.1 X |
| 3,580,630 | 5/1971 | Fetter | 297/188.04 X |
| 3,583,518 | 6/1971 | Bichel et al. | 180/89 |
| 3,594,039 | 7/1971 | Harp | 297/188.1 X |
| 4,252,368 | 2/1981 | Miller et al. | 297/378.12 X |
| 4,268,086 | 5/1981 | Okuyama | 297/378.12 X |
| 4,364,602 | 12/1982 | Rigazio | 297/334 |
| 4,518,201 | 5/1985 | Wahlmann et al. | 297/378.1 X |
| 4,668,010 | 5/1987 | Fujiwara | 297/188.04 X |
| 4,915,438 | 4/1990 | Hashimoto et al. | 296/65.1 |
| 5,029,929 | 7/1991 | Sjostrom et al. | 296/69 |
| 5,209,178 | 5/1993 | Rowe | 297/188.1 X |
| 5,511,853 | 4/1996 | Wallis | 297/188.1 X |
| 5,524,959 | 6/1996 | Scott | 297/188.04 X |

FOREIGN PATENT DOCUMENTS 6144092   5/1994   Japan ................. 297/378.1

*Primary Examiner*—Peter M. Cuomo
*Assistant Examiner*—Rodney B. White
*Attorney, Agent, or Firm*—J. William Stader; Larry W. Miller; Frank A. Seemar

[57] ABSTRACT

The disclosure relates to a dual pivoting buddy seat with utility tray located near the operator's chair in the cab of a combine harvester. The seat base is pivotally attached to the storage compartment by a seat base hinge. The slide rail assembly is pivotally attached to the seat base by the seat back pivot hinge. The slide rail assembly is inserted between the utility tray and the seat back. The utility tray has a molded rail guide which receives the slide rail assembly. The seat back has a pair of slide strips which the slide rail assembly also is located. The motion of the utility tray and seat back relative to the slide rail assembly is controlled by four adjustment screws.

20 Claims, 7 Drawing Sheets

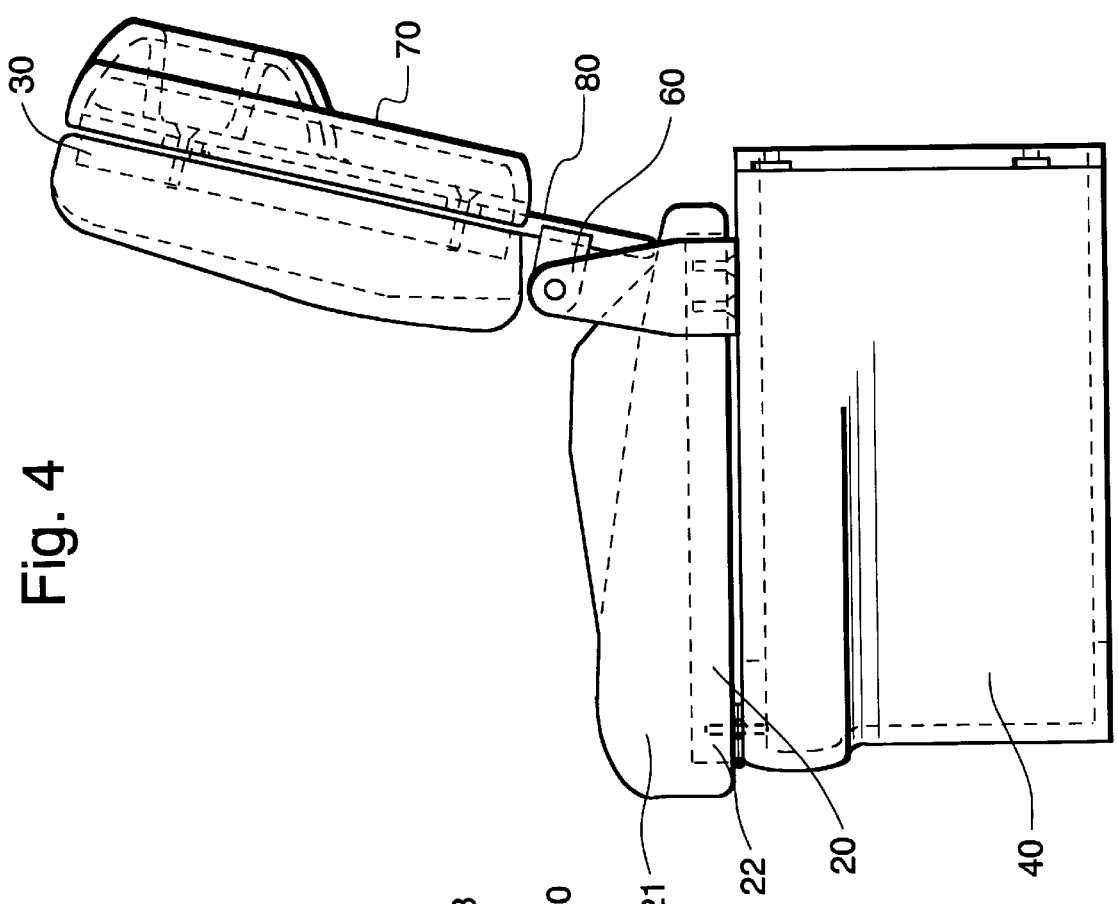
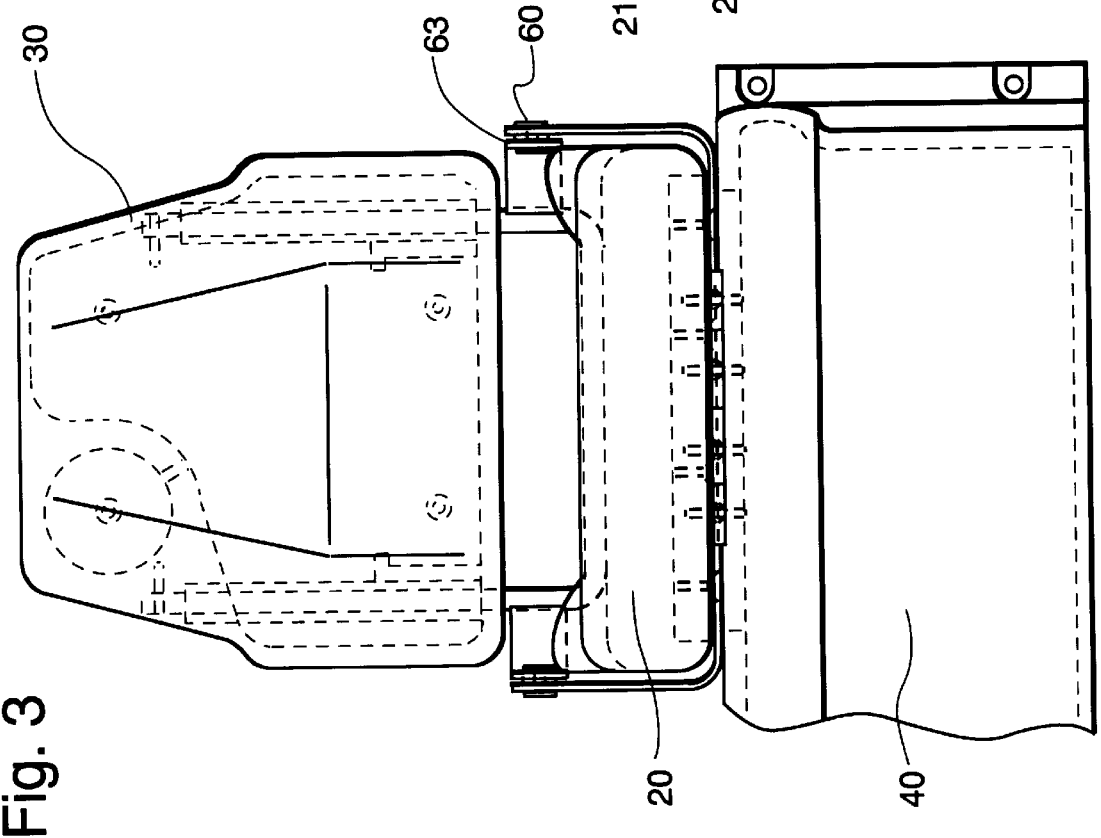

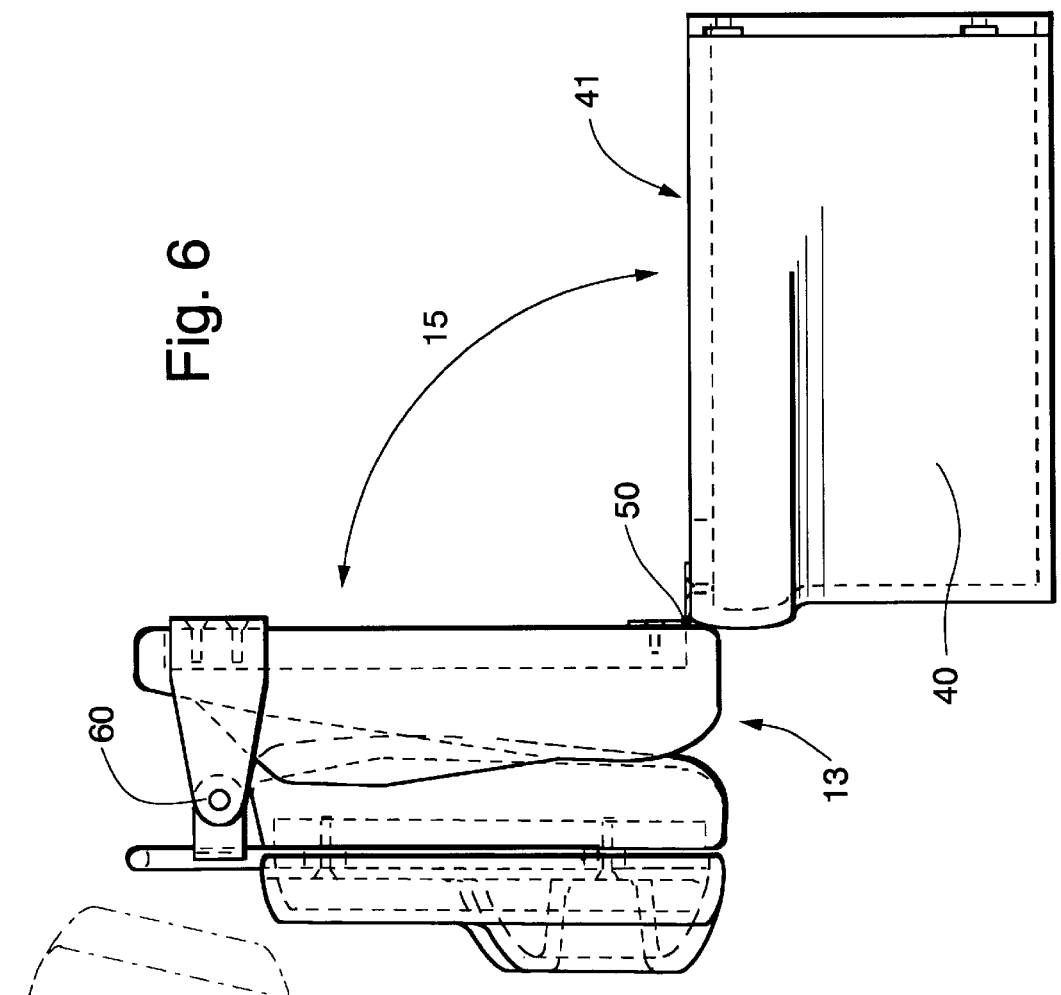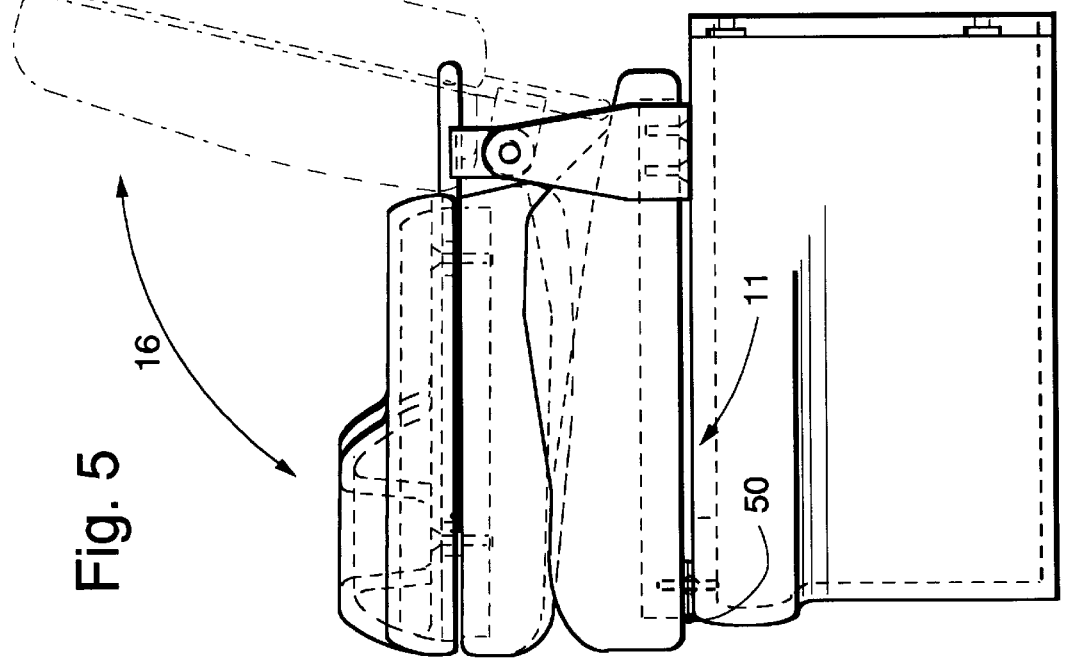

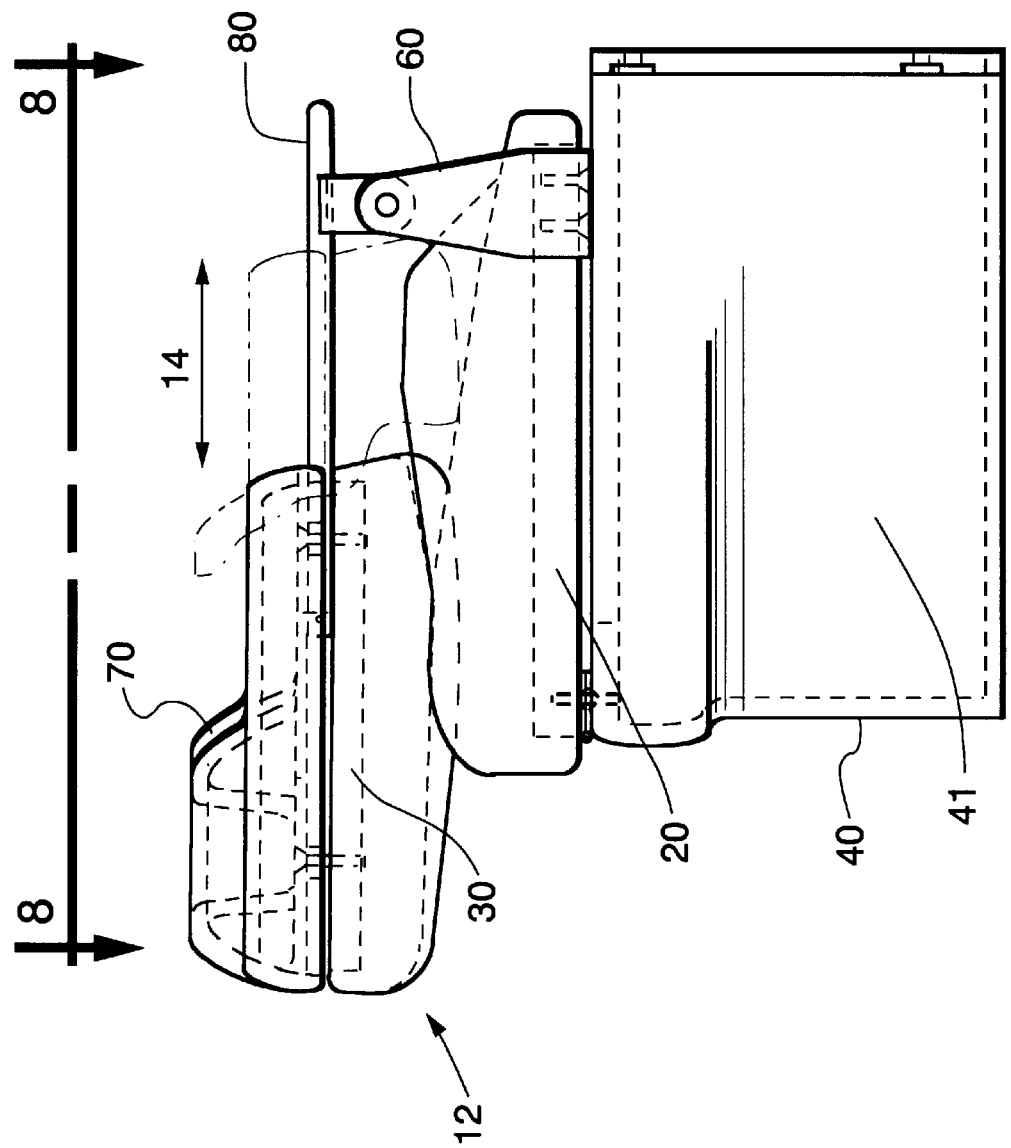

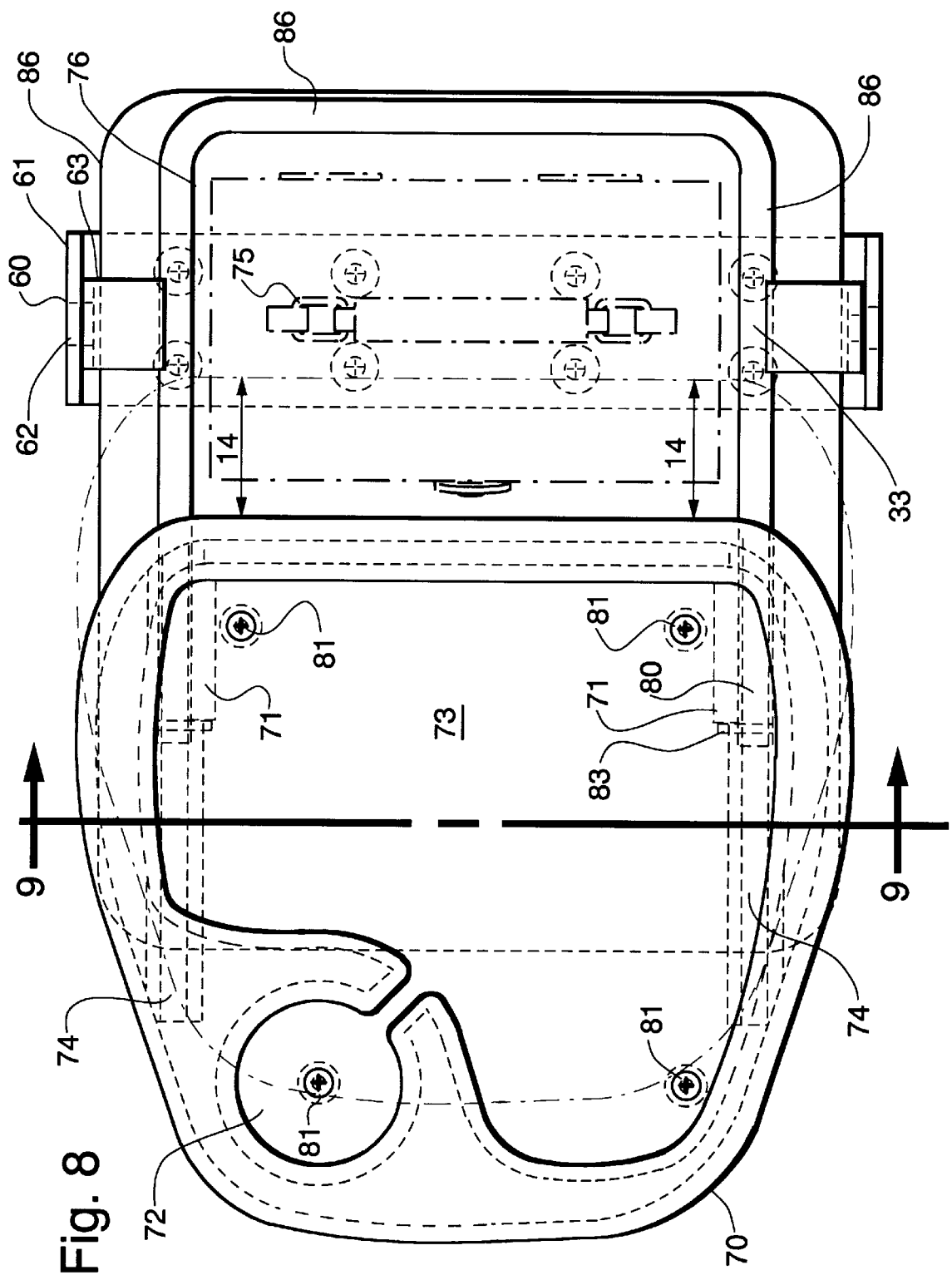

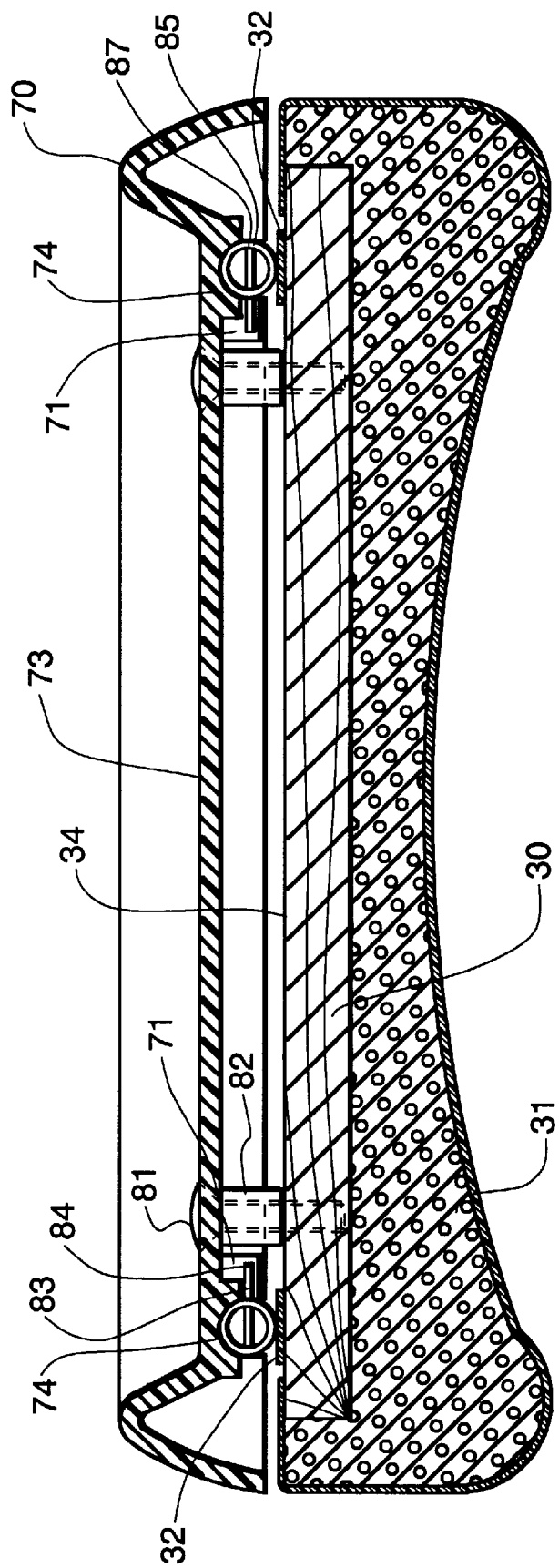

DUAL PIVOTING BUDDY SEAT WITH SLIDING UTILITY TRAY

BACKGROUND OF INVENTION

1. Field of Art

This invention relates to the improvement of the buddy seat in the cab of an agricultural combine harvester. More specifically it relates to a dual pivoting buddy seat with a sliding utility tray.

2. Description of Prior Art

Mechanical harvesting of grain has taken place for decades. However, efforts continue in the attempt to make harvesting operations more efficient and effective. A combine harvester generally includes a head which cuts the crop. The head then moves the cut crop into a feeder house. The feeder house lifts the cut crop into the threshing and separation areas of the combine. The grain is separated from the stalk by a rotor. The grain is then moved and stored in a grain tank. The chaff and trash are deposited from the rear of the combine. An operator usually runs these various operations from a glass-enclosed cab. Typically, a cab is located behind the head and in front of the threshing and separation areas of the combine. An operator can observe most of the combine activities from the cab. During harvesting periods it is not uncommon for the combine to be operated for an extended time. Sometimes a single operator will use a combine for 16 to 18 hours; a day. Furthermore, several operators may alternate in the use of the combine. Therefore is it necessary to provide a cab which will allow maximum operator comfort and flexibility. This will permit the operator to remain mentally alert for the long time intervals needed to harvest crops. One aspect of maintaining the operator's alertness is to provide a second seat or buddy seat in the cab. The design of the buddy seat should be such as to minimize the space required. Also, a flat utility area which could be provided might also help keep the driver alert by allowing the placement and storage of various items. For instance, a beverage holder or lunch box holder are examples of items which an operator might wish to save. Furthermore, with the advent of precision farming and various computerized systems, it would be advantageous to have an area that a lap-top computer or similar equipment could be placed and easily observed during farming operations.

The effort to design and manufacture a buddy seat and storage compartment which is proximal to an operator of a farm vehicle is considerable. The research effort has followed several paths. Most devices have been designed to move the operator's chair or buddy seat to allow for maximum comfort during farming operations. Typically, in the conventional cab, the seat back of the buddy seat is fixed to the cab's rear wall. The seat base is pivotally affixed to the rear avail of the cab and is lifted up or pushed down when not in use. To ensure that the driver's view is not blocked, the buddy seat is located behind and towards the left side of the operator. While this does not impact the operator's view it is difficult for the operator to utilities the buddy seat as storage or utility area. In a conventional cab, the operator would have to reach back to get any items. Furthermore, the operator utilizing a lap-top computer or monitoring device would not be able to easily view the device.

The prior art illustrates these and additional difficulties. U.S. Pat. No. 3,583,518 discloses an operator's station for a self-propelled agricultural machine. The operator's chair is capable of sliding rearward to allow for the operator to stand while driving the combine.

U.S. Pat. No. 4,364,602 discloses a seat support structure for the driving of an earth moving machine. The entire seat structure slides rearward and then up the rear of the driving station. This chair is complex to move and does not allow the operator to easily move the chair during vehicle operations.

U.S. Pat. No. 4,915,438 discloses a vehicular seating apparatus. An assistant driver's seat is moved to the side and allows the driver to go to the rear of the vehicle during operations. The assistant's seal: moves towards the driver's seat to create the space. No storage space is developed as a result of the movement. The movement mechanism consists of several complex tracks on which the entire chair slides. This mechanism is complex and subject to becoming jammed if an objected is dropped on track.

U.S. Pat. No. 5,029,929 discloses a bed arrangement in the coupe area of a vehicle. In this disclosure, the seat back of the operator's chair comprises a pivoted upper and lower portions. The upper portion of the seat back is positioned so as to be part of a bed. The remaining portion of the bed is pivotally affixed to the rear wall of the cab. The main drawback to this design is the inability of the operator to utilize the bed or any storage space during the operation of the vehicle.

Consequently, the need exists for a buddy seat which is positioned in a cab of a combine harvester such that the operator has an unobstructed view of farming operations, but can easily be used as a storage or utility area.

OBJECTS OF THE INVENTION

It is an object of the present invention to provide a dual pivoting buddy seat with sliding utility tray located proximal to the operator's chair and uses a minimum amount of space in a combine cab.

It is a further object of the present invention to provide a dual pivoting buddy seat with sliding utility tray that has a utility tray that has a utility area and beverage holder located proximal to the operator's chair.

It is a further object of the present invention to provide a dual pivoting buddy seat with sliding utility tray which may pivot so as to allow an operator to easily view the storage area.

It is a further object of the present invention to provide a dual pivoting buddy seat with sliding utility tray which may, pivot and move so as to allow an operator to easy access to the utility tray.

It is a further object of the present invention to provide a dual pivoting buddy seat with sliding utility tray which uses a slide rail assembly that can be adjusted by four adjustment screws and spacers.

It is a further object of the present invention to provide a dual pivoting buddy seat with sliding utility tray which uses a coated slide rail assembly so as to minimize friction.

It is a further object of the present invention to provide a dual pivoting buddy seat with sliding utility tray which uses a sliding strip in contact with the slide rail assembly so as to minimize friction.

It is a further object of the present invention to provide a dual pivoting buddy seat with sliding utility tray which uses two stop pins oriented towards the center of the seat back to limit the length of slide of the slide rail assembly.

It is a further object of the present invention to provide a dual pivoting buddy seat with sliding utility tray which creates a rectangular opening large enough to accommodate a conventional lunch box.

It is a further object of the present invention to provide a dual pivoting buddy seat with sliding utility tray which has a utility area large enough to accommodate a lap-top computer or monitor and still be more easily viewed by the operator.

It is a further object of the present invention to provide a dual pivoting buddy seat with sliding utility tray which has color and styling matched contoured seat cushions on the seat base and seat back.

SUMMARY OF THE INVENTION

The invention overcomes the deficiencies of the prior art. The invention is a dual pivoting buddy seat with utility tray. The invention is positioned near the operator's chair in a combine harvester. The seat base is pivotally attached to the storage compartment by a seat base pivot hinge. A slide rail assembly is pivotally attached to the seat base by the seat back pivot hinge. The slide rail assembly is inserted between the seat back and utility tray. The slide rail assembly is placed on a molded rail guide on the utility tray and a sliding strip on the seat back. The friction between the utility tray, seat back and slide rail assembly is controlled by four adjustment screws with spacers. By loosening or tightening the adjustment screws, the friction between the slide rail assembly and utility tray or seat back is controlled. The seat back may be placed in a horizontal position and the utility tray extended forward. This places the utility tray in a location proximal to the operator. The seat base may also be tilted forward to allow access to the storage compartment. A stop pin contacting a molded stop on the rail guide prevents the utility tray and seat back from becoming separated from the slide rail assembly. The utility tray also has a molded beverage holder and utility area capable of receiving a lap-top computer or monitoring device.

BRIEF DESCRIPTION OF THE DRAWINGS

The advantages of this invention will be apparent upon consideration of the following detailed disclosure of the invention, especially when taken in conjunction with the accompanying drawings wherein:

FIG. 3 is a front elevation view of the present invention as seen from line 3—3 of FIG. 2.

FIG. 4 is a side elevational view of the seat of FIG. 3.

FIG. 5 is a view similar to FIG. 4, but with the seat back folded down to expose the tray.

FIG. 6 is a view similar to FIG. 5, but with the seat base rotated forward to give access to the storage access view.

FIG. 7 is a view like FIG. 5, but with the seat back and utility tray extended proximal to the operator's chair.

FIG. 8 is a plan view of the structure of FIG. 7 to a larger scale as seem from the line 8—8 of FIG. 7 showing the rectangular 'lunch box' opening.

FIG. 9 is an enlarged sectional view through the tray and seat back taken on the line 9—9 of FIG. 8.

DETAILED DESCRIPTION OF THE INVENTION

Figure 1:
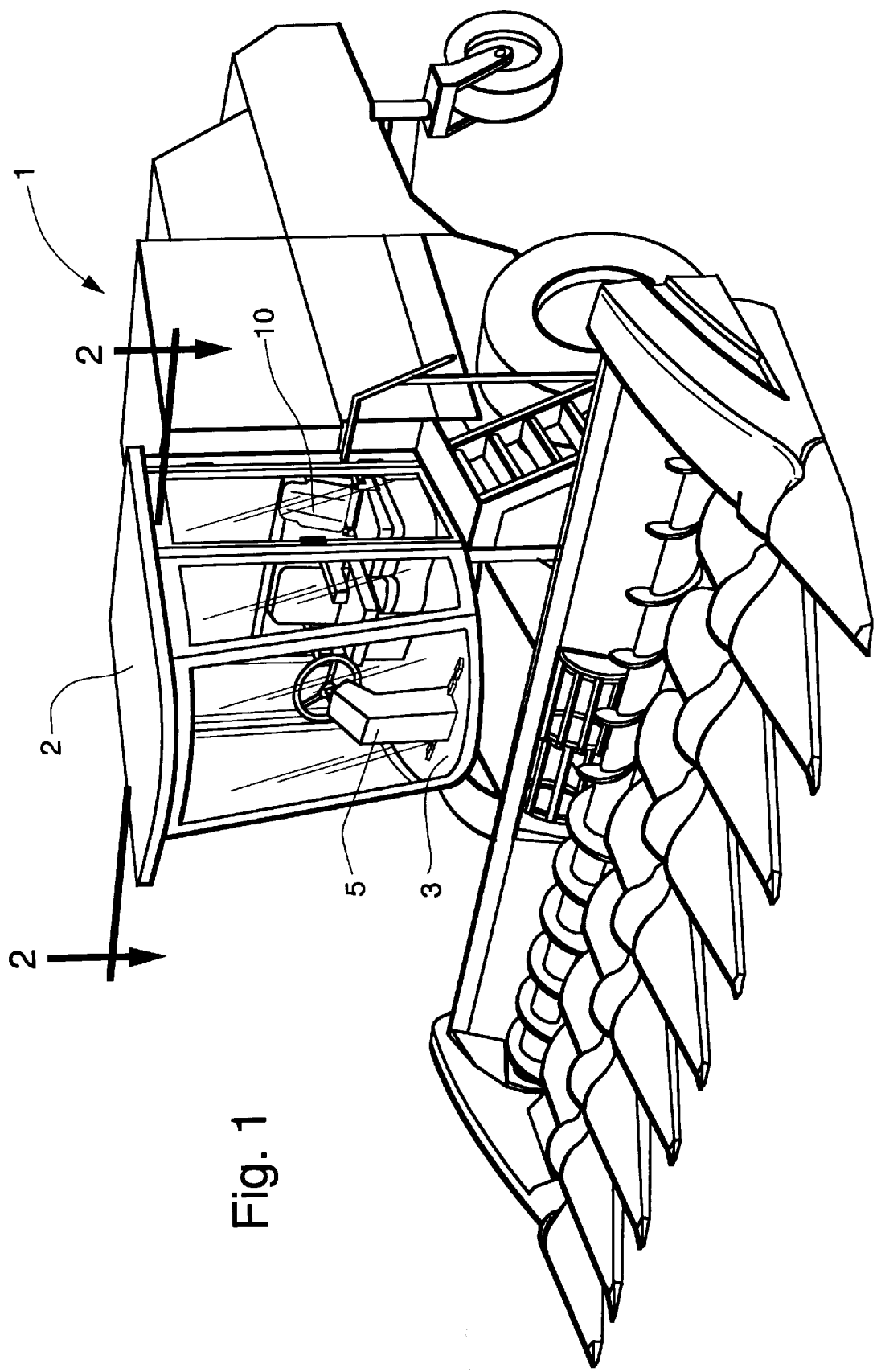
FIG. 1 is a general view of a combine harvester combine with a containing the present invention.
Figure 2:
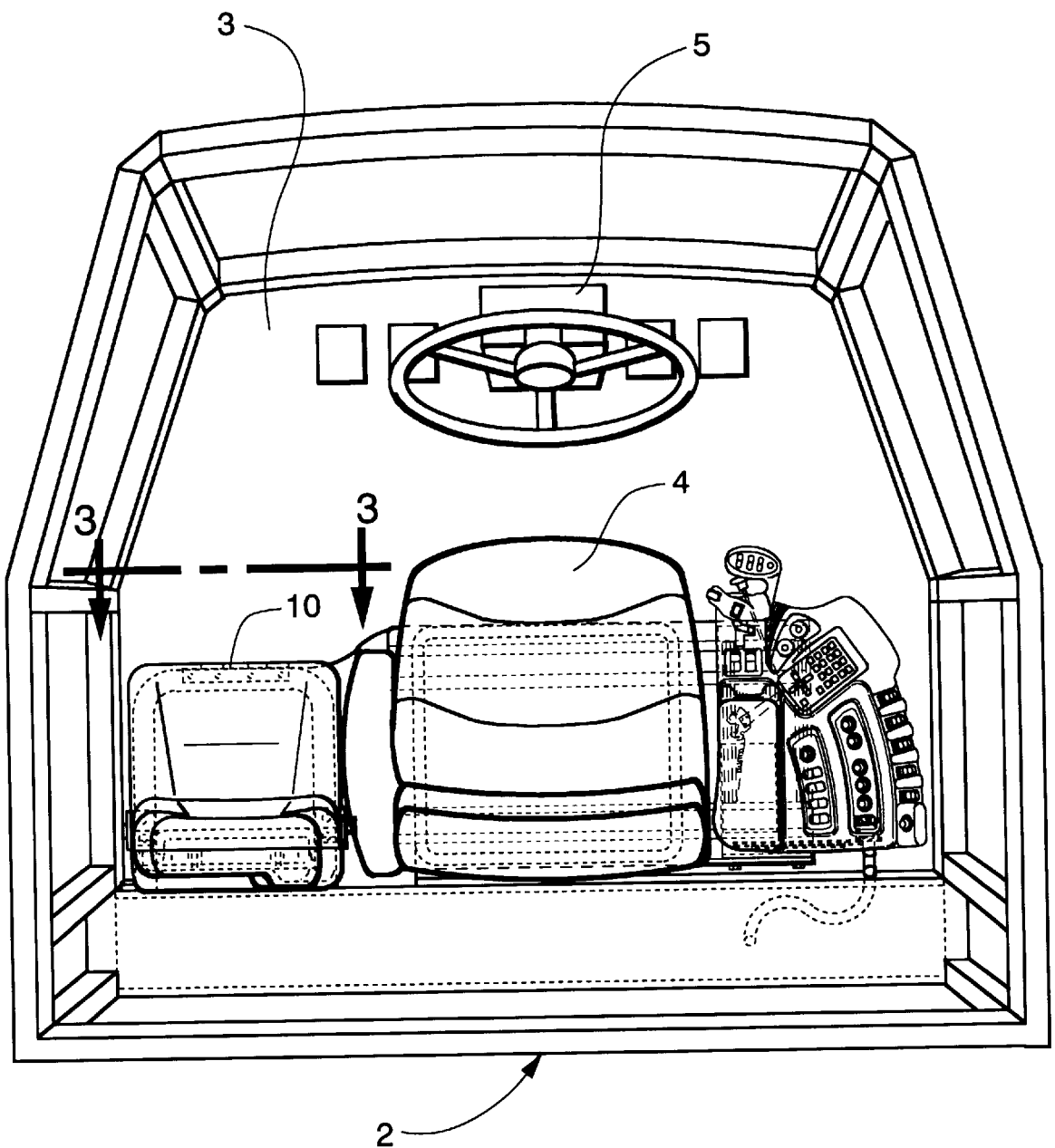
FIG. 2 is a plan view of a cab as seen from the line 2—2 of FIG. 1.

Referring to the drawings, it is possible to observe the major elements and general operation of the present invention. Left and right references are used as a matter of convenience and are determined by standing at the rear of the combine and facing the forward end in the normal direction of travel. Likewise, forward and rearward are determined by normal direction of travel of the combine. Upward or downward orientations are relative to the ground or operating surface. Horizontal or vertical planes are also relative to ground.

The invention is located within the cab of a combine. A typical combine has a header for cutting a crop. As the combine and header are moved forward, the grain and stalk are cut by the header. The header moves the grain into an auger trough. A transverse auger pushes the grain and stalk in the auger trough to the center of the header. Located at the center of the header is the feeder house or elevator. The feeder house moves the grain and stalks rearward into the threshing and separation systems of the combine. After processing and separation, the processed grain is stored in a grain tank located near the top of the combine. The trash or chaff is ejected from the rear of the combine. The operator runs the combine from the cab located behind the header and at the front of the combine. From the cab the operator can observe most the various combine functions. The cab usually has a large glass window or several windows which afford the operator the maximum ability to monitor the header. Located in the center of the cab is the steering column. Behind the steering column is an operator's chair.

The present invention 10 is located within the cab 2 of the combine 1 and consists of several elements. A general review of the major elements will be followed by a more detailed description later. The present invention is a second seat or buddy seat 10 located next to the operator's chair 4 in the cab 2 of a combine 1. The buddy seat has a seat base 20 pivotally attached to a storage compartment 40 by a seat base pivot hinge 50. The slide rail assembly 80 is pivotally attached to the seat base 20 by a seat back pivot hinge 60. The slide rail assembly 80 is inserted between the seat back 30 and utility tray 70.

The storage compartment 40 is located on the interior cab floor 3. The storage compartment 40 is located by the operator's chair 40 and supports the remaining elements of the present invention 10. In the preferred embodiment, the storage compartment 40 is roughly square-shaped with some contouring. The contouring prevents the accumulation of dust and dirt in various corners. The contouring also provides for modern styling, easier entry and egress and more leg room. Also in the preferred embodiment, a portion of the storage compartment is affixed to the supports of the operator's chair 4. The storage compartment may be affixed to a portion of the rear cab wall. An opening in the storage compartment creates the storage access view 41. The storage access view 41 enables the operator to gain access to the interior of the storage compartment. Various maintenance items may be accessed in this manner. Specifically, elements of the electrical or air conditioning system may be serviced. It is also possible to store various items such as an ice chest, manuals or machine maintenance tools and supplies.

The seat base 20 is attached to the storage compartment 40 by the seat base pivot hinge 50. The seat base 20 covers the storage access view 41 when lowered. The seat base pivot hinge 50 is attached at a forward location 22 of the seat base 20. This location allows the seat base 20 to move in the direction of the arrow 15 about the seat base hinge. The seat base 20 also has a seat base contoured cushion 21.

The slide rail assembly 80 has a tubular cross-section 85 and is generally 'C'-shaped. Located at the ends of the slide rail assembly 80 are a pair of identical stop pins 83. Each stop pin 83 is attached to the assembly 80. Each stop pin 83 has a stop pin tip 84. An electroplated black coating 87 may be placed on the assembly 80 to reduce friction of the utility tray 70 and seat back 30.

The slide rail assembly 80 is attached to the seat base 20 by the seat back pivot hinge 60. The seat back pivot hinge 60 is attached at a lower location 33 of the slide rail assembly 80. The seat back pivot hinge 60 has an elongated hinge support 61. The hinge 60 rotates about a pair of identical bolts 62 and friction washers 63. The friction washer 63 helps provide a more controlled rotation about the hinge 60. The seat back pivot hinge 60 located at the lower location 33 on the slide rail assembly 80 allows the seat back to be moved in the direction of the arrow 16 (as viewed in FIG. 5) from the vertical position to the horizontal position 11.

The slide rail assembly 80 is inserted between the seat back 30 and utility tray 70. The seat back 30 also has a contoured cushion 31. Also located on the seat back are a pair of identical slide strips 32. The slide strips are rectangular pieces of plastic or similarly smooth material. The slide strips 31 are oriented lengthwise from the top to bottom of the seat back 30. The slide rail assembly 80 contacts the slide strips 32. It should also be noted that the stop pin tips 84 are oriented towards the seat back center 34.

The utility tray 70 is attached to the seat back 30 by four adjustment screws 81. On the top surface of the utility tray 70 there is a molded beverage holder 72 and a utility area 73. On the underside of the utility tray 70 there is a semi-circular, molded rail guide 74. There are two identical, mirror image guides, generally parallel and oriented towards the front and rear of the utility tray 70 (when the tray is in the horizontal position). The slide rail assembly 80 is inserted into rail guide 74, so that the rail assembly 80 is capable of sliding relative to the utility tray 70. Affixed to the rail guide 74 is a molded stop 71. The molded stop 71 is located on the side of the rail guide 74 closest to the center of the utility tray. Each adjustment screw 81 has a spacer 82. The spacer 82 can be embedded into the utility tray 70. When the adjustment screw is tightened, the spacer ensures that the utility tray 70 still has sufficient friction between the seat back 30, utility tray 70 and the slide rail assembly 80, yet still permit movement of the seat back 30 and utility tray 70.

During normal operations, the seat back 30 of the present invention 10 is in the vertical position. This enables a second individual to be seated by the operator. The seat back 30 can be rotated about the seat back pivot hinge 60 into a horizontal position 11. The operator can then slide the utility tray 70 and seat back 30 forward 12 relative to the seat base 20. The utility area 73 is then positioned near the operator. This allows the operator to place items onto the utility area 73, such as a lap-top computer or monitor. When the utility tray 70 and seat back 30 are moved forward, a rectangular opening 75 is created. The length 76 of the rectangular opening is 215 millimeters. This opening 75 is sufficiently large to accommodate a conventional lunch box. If the operator needs to access the storage compartment, the seat base 30 may be tilted 13 to allow access to the storage compartment through the storage access view. To adjust the sliding motion of the seat back 30 and utility tray 70 relative to the slide rail assembly 80, the adjustment screws 81 may tightened or loosened. The slide rail assembly 80 is inserted between the rail guide 74 on the utility tray 70 and the slide strip 32. The stop pin 83 contacting the molded stop 71 prevents the slide rail assembly 80 from separating from the utility tray 70 and seat back 30.

It will be obvious to those skilled in the art that various changes may be made without departing from the scope of the invention and the invention is not to be considered limited to what is illustrated in the drawings and described in the specification.

What is claimed is:

1. A dual pivoting buddy seat with sliding tray, comprising:
    a. a storage compartment for fixing to a cab floor;
    b. a seat base pivotally affixed to the storage compartment;
    c. a slide rail assembly pivotally affixed to the seat base; and
    d. a seat back and a utility tray slideably affixed to the slide rail assembly, whereby the seat base is pivoted to view the storage compartment and the seat back is pivoted to allow access to the utility tray and the utility tray may be slideably moved relative to the seat base.

2. The dual pivoting buddy seat described in claim 1, wherein the seat back further comprises a plurality of adjustment screws, each screw having a spacer, whereby adjustment of each said screw controls the sliding of the utility tray.

3. A dual pivoting buddy seat with sliding tray within a cab of a combine, comprising:
    a. a storage compartment for fixing to a cab floor of the cab, said storage compartment proximally located by an operator's chair;
    b. a seat base pivotally affixed to the storage compartment by a seat base pivot hinge, the seat base hinge located at a forward location on the seat base;
    c. a utility tray affixed to a seat back with a slide rail assembly pivotally affixed to the seat base by a seat back pivot hinge, the seat back hinge located at a lower location on the slide rail; and
    d. the slide rail assembly slideably inserted between said utility tray and seat back, whereby the seat base is pivoted to view the storage compartment and the seat back is pivoted to allow access to the utility tray and the utility tray is slideably moved relative to the seat base.

4. The dual pivoting buddy seat with sliding tray described in claim 3, wherein the utility tray further comprises a semi-circular, molded rail slide for slideably receiving the slide rail assembly.

5. The dual pivoting buddy seat with sliding tray described in claim 4, wherein the slide rail assembly has an electroplated black coating for reducing friction between the slide rail assembly and utility tray and between the slide rail assembly and seat back.

6. The dual pivoting buddy seat with sliding tray described in claim 5, wherein the molded rail slide further comprises a molded stop.

7. The dual pivoting buddy seat with sliding tray described in claim 6, wherein the slide rail assembly further comprises a stop pin, whereby the stop pin contacts the molded stop to limit slideable motion between the utility tray and seat base.

8. The dual pivoting buddy seat with sliding tray described in claim 7 wherein a stop pin tip is oriented towards a center of the seat back.

9. The dual pivoting buddy seat with sliding tray described in claim 8 wherein the seat back further comprises a slide strip, said slide strip contacting the slide rail assembly, whereby the slide strip further reduces friction between the slide rail assembly and the seat back.

10. The dual pivoting buddy seat with sliding tray described in claim 9, wherein the utility tray is affixed to the seat back by a plurality of adjustment screws, each screw having a spacer, whereby adjusting said screw adjusts the sliding of the utility tray relative to the seat base.

11. The dual pivoting buddy seat with sliding tray described in claim 10 wherein the seat back hinge further comprises an elongated hinge support.

12. The dual pivoting buddy seat with sliding tray described in claim 11, wherein the storage compartment has a storage access view, therein, said access view located beneath the seat base.

13. The dual pivoting buddy seat with sliding tray described in claim 12 wherein the seat back hinge further comprises a bolt and a friction washer for limiting pivotal movement between the slide rail assembly and the seat back.

14. The dual pivoting buddy seat with sliding tray described in claim 13 wherein the rail slide assembly slides from the utility tray creating a rectangular opening.

15. The dual pivoting buddy seat with sliding tray described in claim 14, wherein the seat back further comprises a seat back contoured cushion and the seat base further comprises a seat base contoured cushion.

16. The dual pivoting buddy seat with sliding tray described in claim 15, wherein the utility tray further comprises a molded beverage holder and a utility area.

17. In a cab of a combine harvester, said cab having a cab floor and a steering column, behind said steering column an operator's chair, located proximally to the operator's chair a buddy seat, said seat having a seat base and a seat back, the improvement comprising:
   a. a storage compartment affixed to the cab floor, said storage compartment having a storage access view therein, said storage access view located beneath the seat base;
   b. the seat base with a seat base contoured cushion, said seat base pivotally affixed to the storage compartment by a seat base pivot hinge, the seat base pivot hinge located at a forward location on the seat base;
   c. a utility tray affixed to the seat back by four adjustment screws, each said adjustment screw having a spacer, said utility tray having a semi-circular, molded slide rail, a molded beverage holder, a utility area, said molded slide rail having a molded stop;
   d. a slide rail assembly having an electroplated black coating and two stop pins, each stop pin having a stop pin tip, the stop pin tip oriented towards a center of the seat back, said slide rail assembly is inserted in the molded slide rail between the utility tray and seat back, said slide rail assembly pivotally affixed to the seat base by a seat back pivot hinge, the seat back pivot hinge located on a lower portion of the slide rail assembly, said seat back pivot hinge having an elongated hinge support, a bolt and a friction washer, and
   e. the seat back having a seat back contoured cushion, the seat back having a slide strip which slideably contacts the slide rail assembly, whereby the seat base is pivoted to view the storage access view, the seat back is pivoted to a horizontal position to allow access to the utility tray and the utility tray is slideably moved relative to the seat base, and the stop pin limiting the sliding motion of the utility tray relative to the seat base by contacting the molded stop.

18. The improvement described in claim 17, wherein the utility tray may slide relative to the seat base creating a rectangular opening 215 millimeters in length.

19. The improvement described in claim 18 wherein the utility tray slides relative to the seat base to an extended horizontal position, whereby the utility area is proximal to an operator seated in the operator's chair.

20. The improvement described in claim 19 wherein the slide rail is tubular and "C"-shaped.

* * * * *